(No Model.)

H. B. GREENLEAF.
DRAIN AND SEWER.

No. 266,809.  Patented Oct. 31, 1882.

Witnesses
Horace L. Kent
Joel F. Brown

Inventor
Henry B. Greenleaf
Louis Bagger & Co.
his attorneys

UNITED STATES PATENT OFFICE.

HENRY B. GREENLEAF, OF BOSTON, MASSACHUSETTS.

DRAIN AND SEWER.

SPECIFICATION forming part of Letters Patent No. 266,809, dated October 31, 1882.

Application filed May 26, 1882. (No model.)

*To all whom it may concern:*

Be it known that I, HENRY B. GREENLEAF, a resident of Boston, in the county of Suffolk and State of Massachusetts, have invented certain new and useful Improvements in Clean-Outs for Drains and Sewers; and I do hereby declare that the following is a full, clear, and exact description of the invention, which will enable others skilled in the art to which it appertains to make and use the same, reference being had to the accompanying drawings, which form a part of this specification, and in which—

Figure 1:
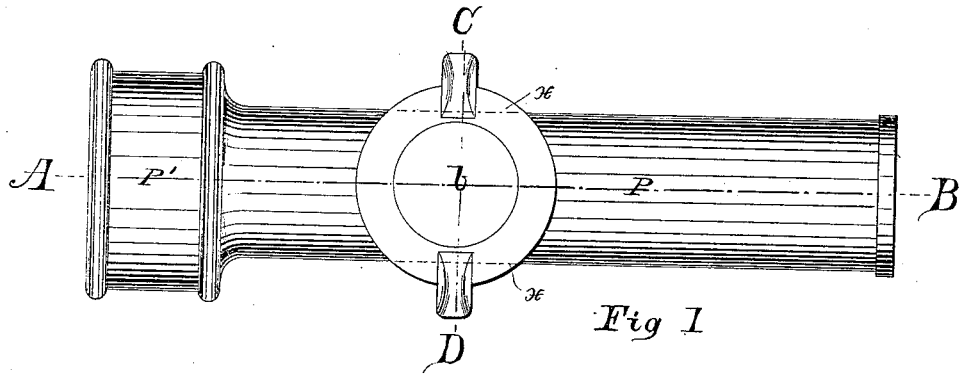
Figure 2:
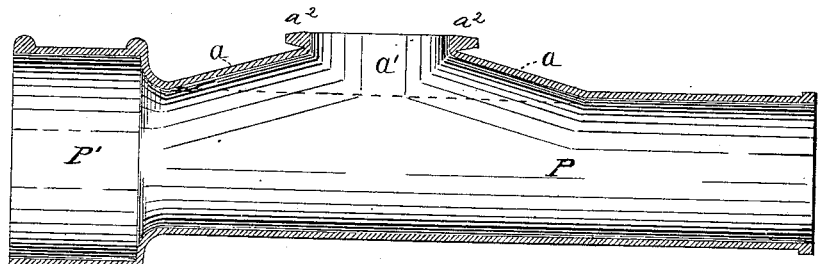
Figure 3:
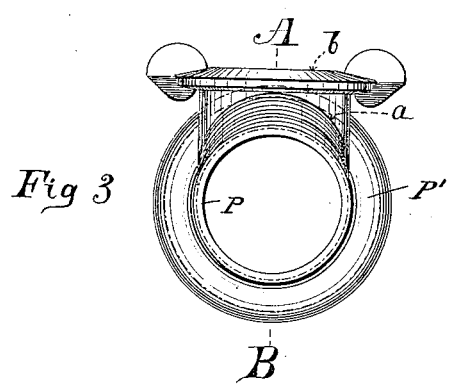
Figure 4:
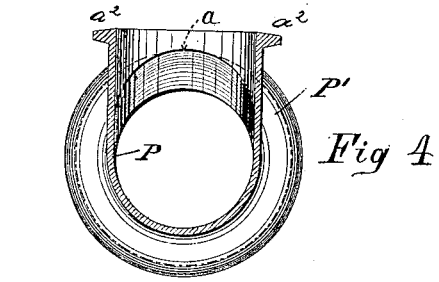

Figure 1 is a plan view, illustrating my improvement in drains or sewers. Fig. 2 is a longitudinal vertical section of the same through line A B in Fig. 1. Fig. 3 is an end elevation, and Fig. 4 is a vertical transverse section through the line C D in Fig. 1.

Similar letters of reference indicate corresponding parts in all the figures.

My invention has relation to means or devices for cleaning out drains or sewers; and it consists in the detailed construction, as hereinafter described, of a length or section of drain-pipe or sewer-pipe, made of iron, earthenware, or other suitable material, which is particularly adapted for the insertion of a rod or pole by which the sewer may be cleaned and obstructions removed.

In the accompanying drawings, the letter P represents a section of pipe embodying my improvement. This pipe is of tubular or cylindrical shape, as usual, but has a rise or swell, $a$, commencing at one end at the collar P′ and gradually rising to a circular aperture, $a'$, which has an annular seat, $a^2$, adapted to receive the removable flanged cover $b$. By reference to Figs. 3 and 4 of the drawings it will be seen that this swell or rise $a$, which again gradually merges from the other side of the aperture $a'$ into the cylindrical length of pipe P, does not overlap the parallel continuous sides of the latter, (indicated by the dotted lines $x\ x$ in Fig. 1,) so that the pipe will be of even width or thickness with exception of its collar P′, the swells $a\ a$, with their annular seats $a^2$, forming a bump or "whale-back" on the top of the pipe, which does not exceed or overlap the width of the same. By removing the cover $b$ a rod or pole may be inserted through the aperture $a'$ into the pipe P and its adjoining pipe-sections for a considerable distance, without danger of breaking the same or the pole or of chipping the aperture $a'$, through which it is inserted, whenever it is desired to clean out or remove obstructions in the pipe.

I am aware that man-holes of sewers have had tapering sides, and such construction is not here claimed.

What I do claim is—

The section of drain or sewer pipe P, having the upward inclines $a\ a$, the aperture $a'$, and the flanged seat $a^2$, as shown, combined with the cover $b$ and securing means, and the whole adapted to serve as and for the purposes set forth.

In testimony that I claim the foregoing as my own I have hereunto affixed my signature in presence of two witnesses.

HENRY B. GREENLEAF.

Witnesses:
  JOEL F. BROWN,
  CHAS. MACCUBLIN.